Patented Apr. 11, 1950

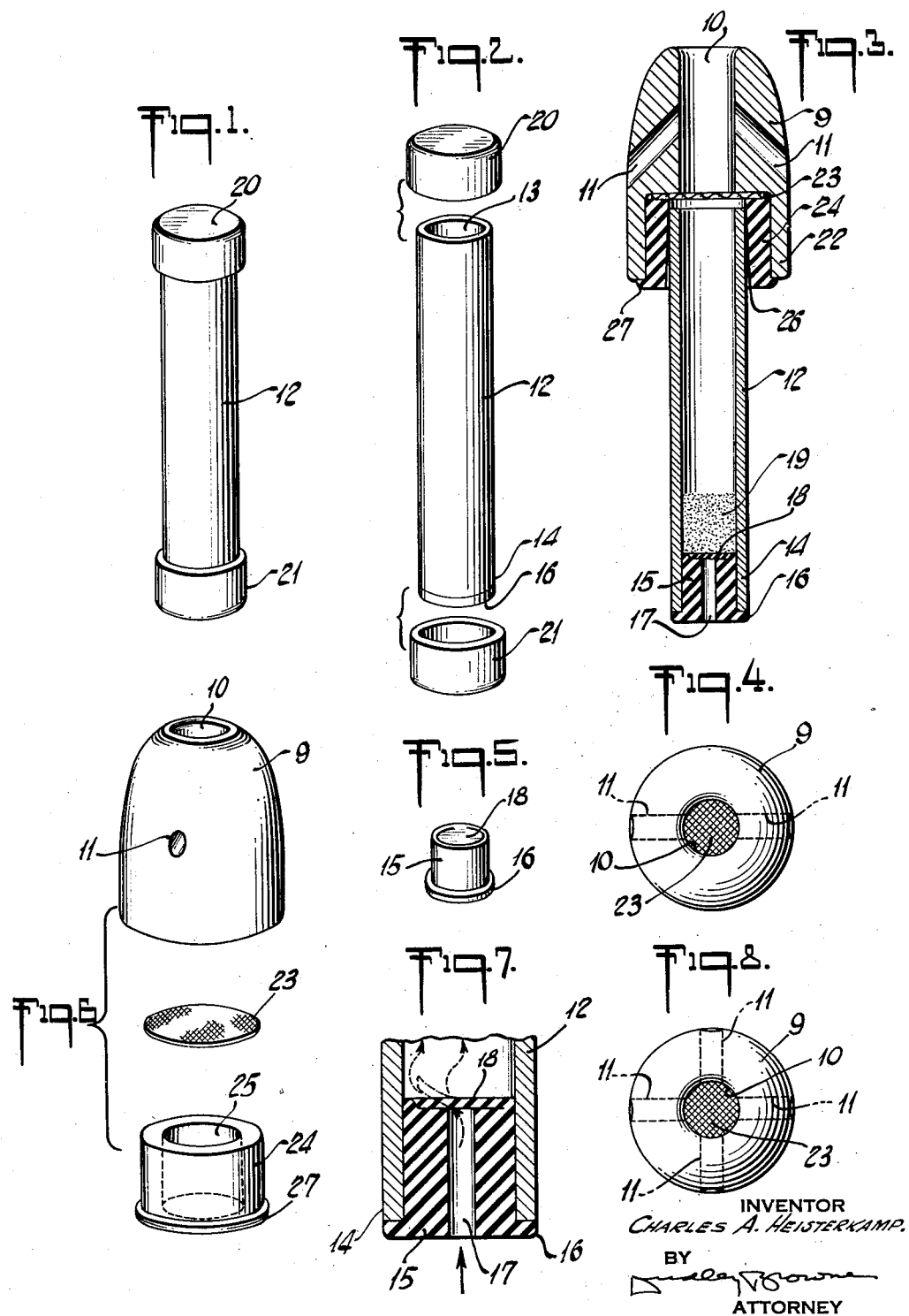

2,503,732

UNITED STATES PATENT OFFICE 2,503,732

INHALATOR

Charles A. Heisterkamp, Wynnewood, Pa., assignor to Wyeth Incorporated, Philadelphia, Pa., a corporation of Delaware Application January 28, 1949, Serial No. 73,242

2 Claims. (Cl. 128—207)

1

This invention relates to inhalators and more particularly to that type of such device primarily adapted for use in connection with the inhalation, both oral or nasal, of penicillin or streptomycin dust or similar pulverulent materials.

With this and other objects in view the invention consists in the details of an inexpensive but efficient inhalator, convenient for use and of low cost to the user so that the device may be discarded following the administration of the contained medicament.

Referring to the accompanying drawing wherein like reference numerals indicate the same parts throughout:

Fig. 1 is a perspective view of the medicament containing cartridge;

Fig. 2 is a like view showing the cartridge sealing caps removed;

Fig. 3 is a vertical cross-section of the device completely assembled;

Fig. 4 is a top plan view of Fig. 3;

Fig. 5 is a perspective view of the valved sealing plug for the cartridge base;

Fig. 6 is an expanded perspective view of the nose or mouthpiece in disassembled relation;

Fig. 7 is an enlarged sectional view of the valved sealing plug shown in Fig. 5; and Fig. 8 is a top plan view of a modified form of the nose or mouthpiece.

The use of the device is built around the association of a mouth or nosepiece, designated as a whole by the numeral 9 and having a central bore 10 and secondary air intake passages 11, either two or four in number (Figs. 4 and 8), with a cartridge for containing the medicament. This cartridge comprises a short piece of tubing 12 preferably of glass or transparent plastic, open at its top end 13 and plugged at its lower end 14 by a valved stopper 15. Such plug stopper 15 is formed of rubber or other suitable elastomer to insure snug fitting within the tube 12 and is provided with an outer flange 16 which limits the inward movement of the plug stopper in the tube by seating upon the end of the tube throughout the circumference thereof. A central air intake 17 is normally closed by a flap valve 18 which can, upon the application of suction or pressure, assume an open position as indicated by the dotted lines in Fig. 7.

If desired, the flange 16 may be dispensed with and the plug 15 seated completely within and below the end 14 of the tube 12.

In practice the cartridge is closed at its lower end by insertion of the plug 15 and a measured amount of the medicament dust, shown at 19, is filled into the tube 12 through its open end 13. Caps 20 and 21 are then applied as shown in Fig. 1, whereafter the unit may be properly sterilized and comprises a package for the medicament.

The fitment 9 is annularly recessed as at 22 to receive a meshed screen 23 covering the central bore 10. A bushing 24 of rubber or other suitable elastomer is seated below the screen 24 and has a central bore 25 in line with the bore 10, such bore 25 being of larger diameter at its outer end 26. A flange 27 engages the external periphery of the wall of the recess 22.

Flange 27 may be eliminated, if desired, and the bushing 24 seated entirely within the recess 22.

When it is desired to use the device for inhalation, caps 20 and 21 are removed from the tube 12 and the upper end 13 thereof inserted firmly in bore 25 of the bushing 24. Since commercial glass tubing similar to that used for tube 12 varies in diameter, the tapering of the bore 25 inwardly from the point 26 of largest diameter, together with the inherent elasticity of bushing 24, permits an interacting wedging action between tube 12 and bushing 24 to hold tubes of varied diameters within the accepted tolerance.

When thus assembled, as shown in Fig. 3, the inhalator is ready for use. Insertion of the piece 9 into the mouth or nasal passage as is desired followed by inhalation will create a suction in the tube 12 through the aligned bores 10 and 25 causing the dust 19 to move upwardly opening the valve 18 to allow outside air to enter through bore 17 whereupon the entire dose of pulverulent medicament will be inhaled by the user, screen 23 effectively overcoming particle coherence as the dust passes therethrough. Secondary air introduced through passages 11 promotes turbulence and further aids in dispersal and distribution of the entrained dust.

Upon evacuation the empty tube 12 is discarded and additional dosage secured as desired by the successive use of new filled cartridges inserted as described.

My device is adapted to be sold in a unit package in any desired conventional container or wrapping, one nose piece being packed with one or more charged cartridges, capped or otherwise sealed, ready for assembly with the nose piece on removal of the caps or other closures. Additional charged and capped cartridges may also be sold separately.

I claim:

1. An inhalator adapted for dispersal and distribution of therapeutic dust in the respiratory passages by inhalation which comprises a nose piece and a medicament-containing cartridge, the nose piece having an axial bore one end of which is of a size to receive one end of the said cartridge with a snug fit, the cartridge being of generally cylindrical tubular form, open at the end fitting into the nose piece and closed at the opposite end by a one-way valve arranged to admit air through that end to the inhalator, the nose piece further being provided with at least one radial passage admitting secondary air to the axial bore to promote turbulence of air inhaled therethrough and being provided with a screen across the axial bore effective to overcome particle coherence of entrained dust passing therethrough.

2. An inhalator adapted for dispersal and distribution of therapeutic dust in the respiratory passages by inhalation which comprises a nose piece and a disposable medicament-containing cartridge, the nose piece having a generally tapered cylindrical form, the proximal end being of a size adapted for apposition to an exterior opening of the human respiratory tract, the nose piece being formed of an elastic material and having an axial bore to admit air to the respiratory tract and at least one radial passage to admit secondary air to the axial bore, a screen positioned across the axial bore effective to overcome particle coherence of entrained dust passing therethrough, an elastic bushing seated in the distal portion of the axial bore in a position to retain said screen, the inner bore of said bushing being alined with and forming a combination of the axial bore of the nose piece and being of a size to receive the proximal end of said cartridge with a snug slip fit, the cartridge being of a generally cylindrical tubular form of a size to fit snugly in said bushing, the proximal end of said cartridge being open and the distal end being closed by a pierced valved plug, the valve in said plug being a one-way valve arranged to retain powdered material in the cartridge when not in use and during inhalation to admit air to the distal end of the cartridge but prevent air from issuing therefrom on accidental reversal of pressure.

CHARLES A. HEISTERKAMP.

REFERENCES CITED

The following references are of record in the file of this patent:

UNITED STATES PATENTS

| Number | Name | Date |
|---|---|---|
| 1,463,663 | Bosworth | July 31, 1923 |
| 2,470,296 | Fields | May 17, 1949 |
| 2,470,297 | Fields | May 17, 1949 |

FOREIGN PATENTS

| Number | Country | Date |
|---|---|---|
| 3,726 | Great Britain | A. D. 1887 |